US009075921B2

(12) United States Patent
Olsa et al.

(10) Patent No.: US 9,075,921 B2
(45) Date of Patent: Jul. 7, 2015

(54) ERROR SIMULATION

(75) Inventors: Jiri Olsa, Brno (CZ); Anton Arapov, Vranov (CZ)

(73) Assignee: Red Hat, Inc., Raleigh, NC (US)

(*) Notice: Subject to any disclaimer, the term of this patent is extended or adjusted under 35 U.S.C. 154(b) by 441 days.

(21) Appl. No.: 13/100,572

(22) Filed: May 4, 2011

(65) Prior Publication Data

US 2012/0284695 A1    Nov. 8, 2012

(51) Int. Cl.
*G06F 9/44* (2006.01)
*G06F 11/36* (2006.01)

(52) U.S. Cl.
CPC .................. *G06F 11/3696* (2013.01)

(58) Field of Classification Search
None
See application file for complete search history.

(56) References Cited

U.S. PATENT DOCUMENTS 7,765,561 B1 * 7/2010 Ellis .............................. 719/330
2003/0056200 A1 * 3/2003 Li et al. ......................... 717/128

* cited by examiner

*Primary Examiner* — Qamrun Nahar
(74) *Attorney, Agent, or Firm* — Lowenstein Sandler LLP

(57) ABSTRACT

An error simulation module may receive an indication of an external function call made by a computer application program. In response to the function call, the error simulation module may provide a simulated output parameter to the computer application program. The error simulation module may receive an indication of a behavior of the computer application program in response to the simulated output parameter.

14 Claims, 5 Drawing Sheets

ERROR SIMULATION

TECHNICAL FIELD

This disclosure relates to the field of software testing and, in particular, to error simulation in a computer application program.

BACKGROUND

Computer application programs are software, consisting of instructions and data, that run on processing systems such as computers. The processing systems may execute the instructions in the computer application program using the data contained therein and/or other data received from other sources (e.g., user input, other computer application programs, etc.). Occasionally a computer application program may encounter an error during processing. The error may be a flaw, mistake, failure, or fault in the computer application program that produces an incorrect or unexpected result, or causes the program to behave in unintended ways. In general, the error may arise from mistakes made by software developers in either a program's source code or its design. In addition, some errors may be caused by compilers producing incorrect code.

Generally, most computer application programs cannot handle an error or other non-expected process or data flow. Some errors may have only a subtle effect on the functionality of the computer application program and may be undetected for a long period of time. Other, more serious, errors may cause the computer application program to crash or freeze, partially or completely interrupting the functionality. These, or other errors, may be used to exploit the system, such as by allowing a malicious user or program unauthorized access. In general, testing how a computer application program will respond to the occurrence of such an error is a difficult and time consuming process. Testing may require access to the source of the computer application program, which a third party may or may not have, and may require that the program be recompiled.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In one embodiment, an error simulation module simulates the occurrence of an error in order to test the resulting behavior of a computer application program. In response to a function call by the computer application program, the error simulation module returns an unexpected output parameter (or return value) to the computer application program. The returned output parameter may be determined from a configuration file which may be created for the purposes of error simulation. The error simulation module may monitor the behavior of the computer application program in response to receiving the output parameter. This allows an application developer, system administrator, user, or other person to determine how the computer application program will react to the occurrence of an error.

The error simulation techniques described herein simplify the procedure of testing the response of a computer application program to an error. The program may be tested without requiring access or changes to the source code of the program. Thus, a tester may simulate errors on a third-party computer application program. In addition, it is not required to rebuild or recompile the code of the computer application program in order to simulate the errors. This makes the error testing process significantly cheaper, faster, and easier.

Figure 1:
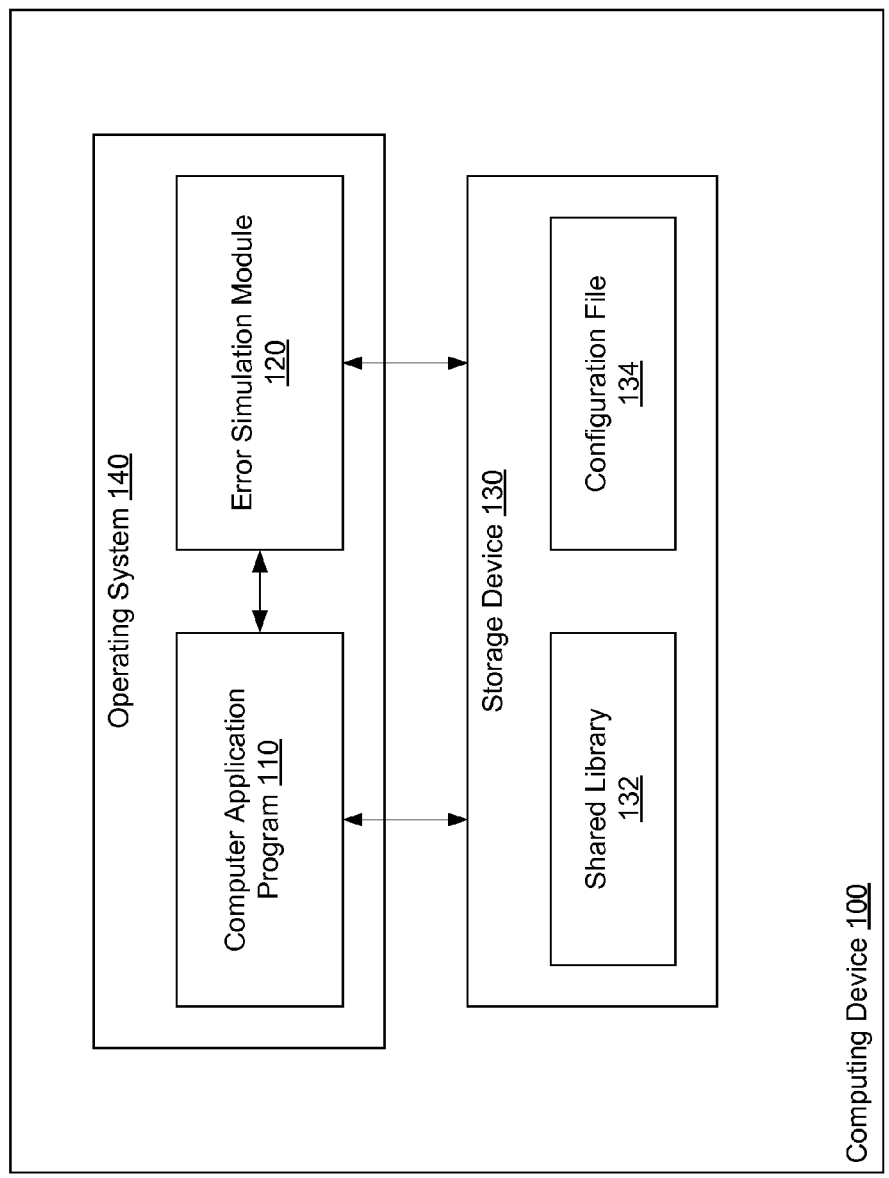
FIG. 1 is a block diagram illustrating a computing device to implement error simulation, according to an embodiment.

FIG. 1 is a block diagram illustrating a computing device to implement error simulation, according to an embodiment of the present invention. Computing device 100, may be for example, a desktop, laptop, notebook, netbook, tablet, smartphone, or other computing device. In one embodiment, computing device 100 includes a computer application program 110, which performs one or more computer implemented functions. Computer application program 110 may implement the functionality of a word processing program, spreadsheet program, email program, chat program, web browser or other program. In one embodiment, computer application program 110 may be part of an operating system (OS) 140 running on computing device 100, or may run on top of the operating system 140. Embodiments of the error simulation described herein may work with any computer application program running on computing device 100.

Operating system 140 may include software, consisting of programs and data, that runs on computing device 100. The OS 140 manages computer hardware and provides common services for efficient execution of various computer application software programs, such as computer application program 110. The OS 140 may include a number of shared libraries 132 accessible to computer application program 110 running on top of the OS 140. The libraries 132 may provide, for example, well defined programming sequences that the applications can reuse. These sequences may be referred to as functions. Numerous interfaces may exist in the OS 140 to allow computer application program 110 to access the needed libraries. The shared libraries 132 may be stored on a storage device 130. Storage device 130 may be, for example, memory, such as read-only memory (ROM), flash memory, random access memory (RAM), etc., or a mass storage device, such as a magnetic or optical storage device. Storage device 130 may store various information regarding operating system 140 and computer application program 110. Storage device 130 may store one or more shared libraries 132, each of which may include one or more functions accessible to all or a subset of the computer application programs 110 running on computing device 100. In one embodiment, one or more shared libraries may be stored externally to computing device 100 and be remotely accessible, such as over a network. Shared libraries 132 may be provided by operating system 140 or by some other computer application program running on computing device 100.

When computer application program 110 makes a function call to one of shared libraries 132, the function performs an associated subroutine (possibly using one or more input parameters supplied by computer application program 110) and generates one or more output parameters (or return values). These output parameters are provided to computer application program 110, which may execute a series of instructions along a corresponding software path in response to the output parameter. For example, one function may be used to open a particular file (e.g., the OpenFile function). Computer application program 110 may call the function (e.g., using an application programming interface (API) call) from shared library 132. The function call may include one or more input parameters, such as the name of the file to open. The function may perform the steps to open the specified file and return an output parameter (or return value) to computer application program 110 indicating whether or not the file was opened successfully. For example, if the file was found and opened, the return value may be "OK," but if the file was not found or opened successfully, the return value may be "FAIL." Computer application program 110 may include different execution paths depending on the received return value. For example, if the return value was "OK," computer application program 110 may move on to a next instruction, but if the return value was "FAIL," computer application program 110 may close or exit. In some embodiments, the execution paths for certain conditions may be unknown, undefined, or contain errors. Error simulation module 120 allows a tester to simulate the return values provided by the function in shared library 132 and monitor how computer application program 110 responds. Error simulation module 120 may be an independent software program or may be part of another program running on computing device 100, or may be part of operating system 140. In one embodiment, the simulated return values may be part of a configuration file 134 which may be stored, for example, in storage device 130. Configuration file 134 may be, for example, a database, table, or some other datastructure.

Other examples of functions available in shared library 132 may include memory allocation, reading a file, or reading a number of files in a directory. For memory allocation (e.g., the AllocMemory function), the input parameter provided by computer application program 110 may include the requested memory size. The output parameters may include a location of the memory, if the allocation was successful, or a zero or other value if there is insufficient memory to satisfy the request. In one embodiment, error simulation module 120 may return a zero to computer application program 110 in order to monitor the response. For reading a file (e.g., the ReadFile function), the input parameter may be a file name and the output parameters may include "OK," if the read was successful, or "ELATER" if the file is currently in use by some other program or user. In one embodiment, error simulation module 120 may return "ELATER" to computer application program 110 in order to monitor the response. For reading a number of files in a directory (e.g., the FilesCount), the input parameter may include the directory name. The output parameters may include the number of files in the directory. In one embodiment, error simulation module 120 may return an incorrect count value, such as a negative or very high number, to computer application program 110 in order to monitor the response.

Figure 2:
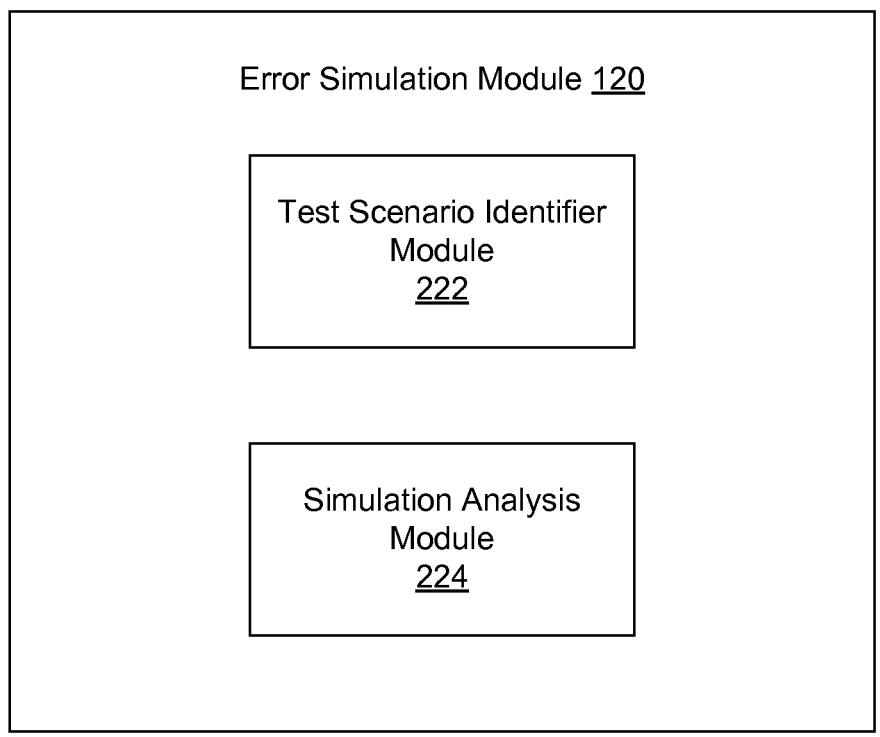
FIG. 2 is a block diagram illustrating an error simulation module, according to an embodiment.

FIG. 2 is a block diagram illustrating an error simulation module, according to an embodiment of the present invention. In one embodiment, error simulation module 120 may include test scenario identifier module 222 and simulation analysis module 224. Test scenario identifier module 222 may be configured to receive an indication of a function call made by a computer application program, such as computer application program 110. Test scenario identifier module 222 may retrieve one or more simulated return values from configuration file 134. The simulated return values may form a test scenario corresponding to the function call. Each of the simulated values in the test scenario may be specifically designed to cause the computer application program 110 to enter a different execution path so that the results can be monitored. The simulated values for a particular test scenario may be identified in configuration file 134 by a function identifier value or other identifier. In one embodiment, there may be simulated values corresponding to different functions in one configuration file 134, however, in other embodiments, there may be separate configuration files corresponding to each function. Test scenario identifier module 222 may provide the one or more simulated return values to computer application program 110. In one embodiment, where there are a plurality of simulated return values, each of the plurality of simulated return values may be provided to computer application program 110 at preset intervals, or one of the plurality of simulated return values may be returned on a rotating basis, such that if the same function call is made by computer application program again, a subsequent one of the plurality of simulated return values will be provided.

Simulation analysis module 224 may receive an indication of program behavior from computer application program 110 in response to test scenario identifier module providing a simulated return value. As described above, computer application program may enter different execution paths depending on the return value received. Computer application program 110 may return a signal or message indicating what execution path was entered and the results of that execution path. Simulation analysis module 224 receives this information and may store it, for example in storage device 130, for later analysis by a software developer, system administrator, user, another computer application program, etc. In other embodiments, simulation analysis module 224 may store the data indicating computer application program behavior in some other location.

Figure 3:
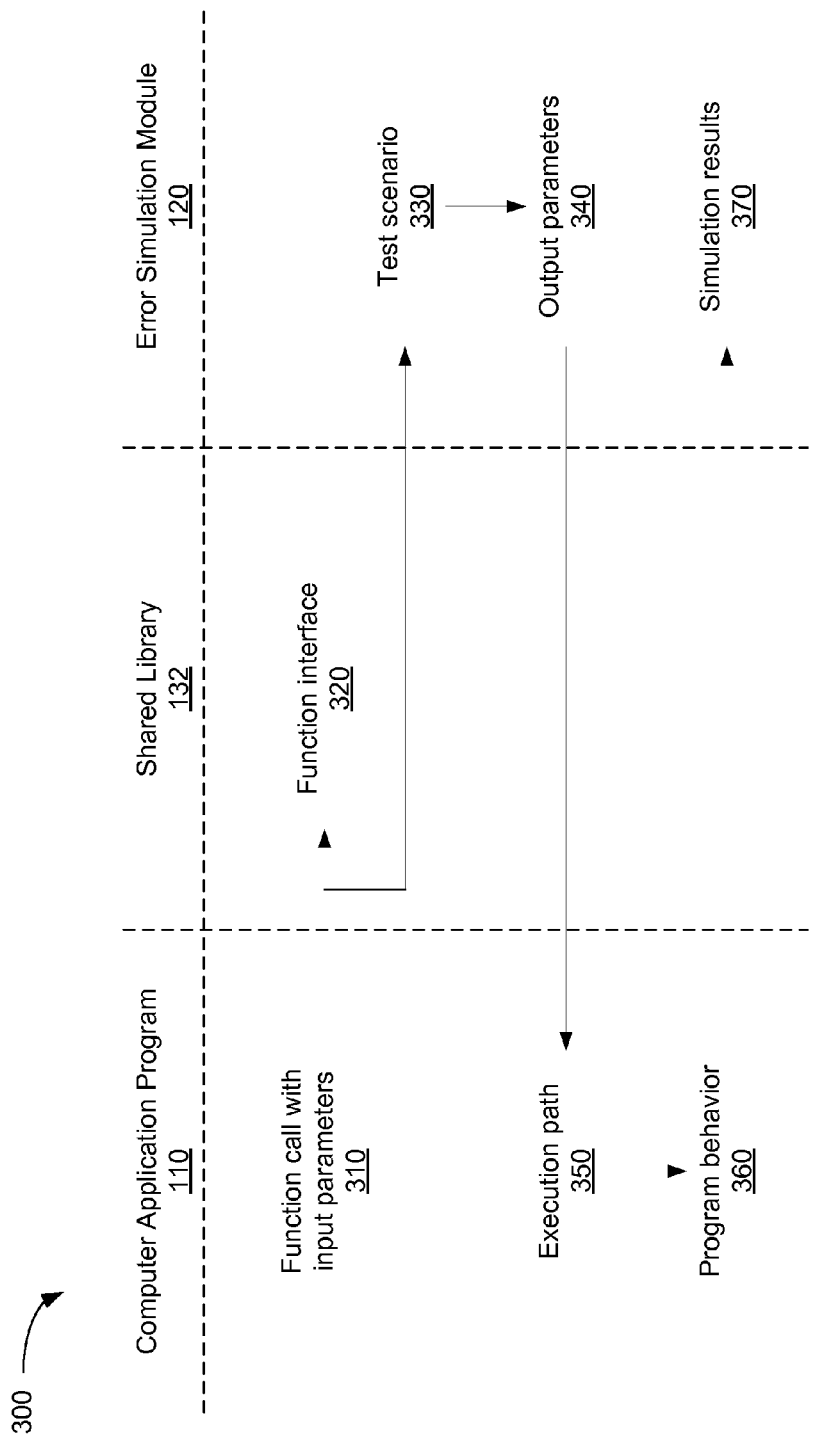
FIG. 3 is diagram illustrating the operational flow for error simulation, according to an embodiment.

FIG. 3 is diagram illustrating the operational flow for error simulation, according to an embodiment of the present invention. In one embodiment, the operational flow 300 includes three separate operators: computer application program 110, shared library 132, and error simulation module 120. In one embodiment, the operational flow 300 begins when computer application program 110 makes a function call 310. The function call may be to a function in shared library 132 and may include one or more input parameters. Under normal operation, shared library 132 receives the function call at a function interface 320. The function interface 320 may identify the requested function, for example, by a function identifier. Under a test mode of operation (e.g., using error simulation), a separate module of the operating system (e.g., dynamic linker module (not shown)) intercepts the function call before in reaches function interface 320. In one embodiment the separate module may create a hook to intercept the function call and route it error simulation module 120. Error simulation module 120 may receive the function call and, using the function identifier, identify a corresponding test scenario 330 including one or more simulated output parameters (or return values) 340. Error simulation module 120 provides the simulated output parameters 340 back to computer application program 110 as the response to the function call 310.

In response to receiving the simulated output parameters 340, computer application program 110 enters a corresponding execution path 350. In one embodiment, simulated output parameters 340 are designed to simulate an error and cause execution path 350 in computer application program 110 to be an error path. Error simulation module 120 may monitor the program behavior 360 upon providing the simulated output parameters 340 and may receive an indication of the program behavior 360 from computer application program 110. Error simulation results may use the same hooks provided by the operating system which are used to intercept the function call made by computer application program 110 to monitor the behavior of computer application program 110 in response to receiving the simulated output parameters 340. Error simulation module 120 may used the hooks to retrieve and store information about the execution path 350 such as the names, arguments, and/or nesting of the called functions. Error simulation module 120 may store the indication of program behavior as simulation results 370. Simulation results 370 may be used in later analysis of how computer application program 110 responds to the occurrence of an error.

Figure 4:
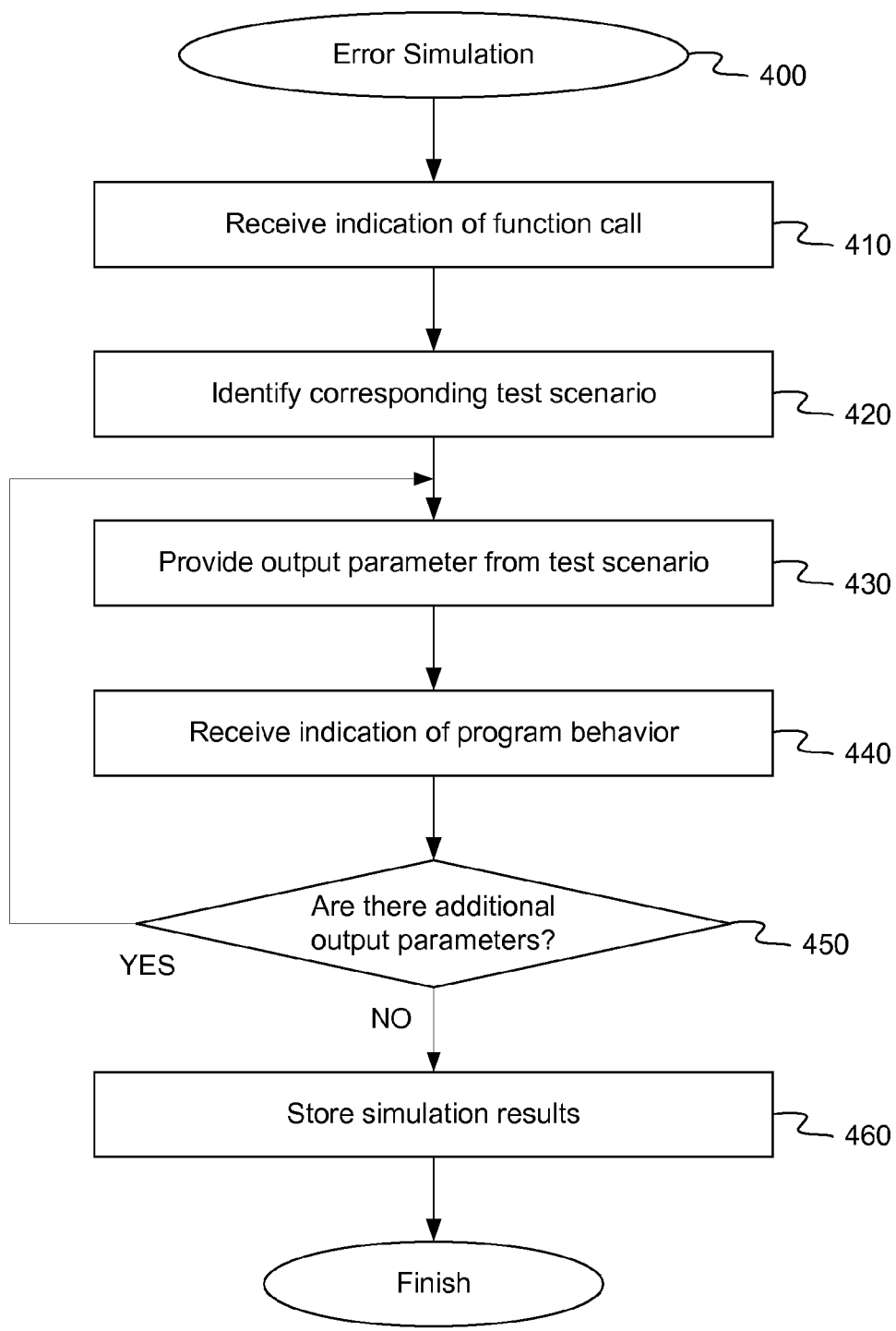
FIG. 4 is a flow diagram illustrating an error simulation method, according to an embodiment.

FIG. 4 is a flow diagram illustrating an error simulation method, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to simulate a software error and monitor how a computer application program responds to the error. In one embodiment, method 300 may be performed by error simulation module 120, as shown in FIGS. 1 and 2.

Referring to FIG. 4, at block 410, method 400 receives an indication of a function call made by a computer application program, such as computer application program 110. Test scenario identifier module 222 of error simulation module 120 may intercept the indication, such as a function identifier, from the function call made to shared library 132. At block 420, method 400 identifies a test scenario corresponding to the received indication of the function call. Test scenario identifier module 222 may read configuration file 134 and identify, based on the function identifier, one or more simulated output parameters (or return values) that make up the test scenario. The test scenario may be stored in configuration file 134, or any other data structure, by a software developer, system administrator or other user, and may be designed to simulate an error in computer application program 110. In one embodiment, the test scenario may include a plurality of simulated output parameters, each designed to cause computer application program 110 to enter a different execution path (e.g., an error path). In one embodiment, where a function call is made several times during the execution of computer application program 110, the test scenario may include an indication of which function call will be the subject of the error simulation. In one embodiment, the application is executed multiple times and at each occurrence of the function call, the error simulation is implemented sequentially. However, in other embodiments, the error simulation may be designated to occur for a particular function call. At block 430, method 400 provides one of the simulated output parameters from the identified test scenario to computer application program 110.

At block 440, method 400 receives an indication of program behavior from the computer application program 110. As discussed above, the simulated output parameters provided at block 430 cause the computer application program 110 to enter an error path. Error simulation module 120 monitors the behavior (e.g., what path was entered and the results of that path) and stores that information using simulation analysis module 224. At block 450, method 400 determines if there are additional simulated output parameters in the test scenario identified at block 420. As discussed above, the test scenario may include a plurality of simulated output parameters. If there are additional simulated output parameters in the test scenario, execution of the computer application program finishes and method 400 returns to block 430, where the next simulated output parameter is provided to computer application program 110 during a next execution of the computer application program. Method 400 may then repeat the steps at blocks 430-450, as necessary for additional simulated output parameters during subsequent executions of the computer application program. If at block 450, method 400 determines that there are no additional simulated output parameters in the test scenario, at block 460, method 400 stores the simulation results for later analysis. The simulation results may include the indication of program behavior received at block 440 for each of the simulated output parameters. Simulation analysis module 224 may store the simulation results, for example, in storage device 130.

In other embodiments, the steps in blocks 410-460 may be performed in some other order. For example, method 400 may store the simulation results for the first simulated output parameter at block 460 before providing the second simulated output parameter at block 430. These are merely examples of how the order of the steps in blocks 410-460 may be ordered, and one of skill in the art would recognize that the steps in blocks 410-460 may be performed in any other order.

Figure 5:
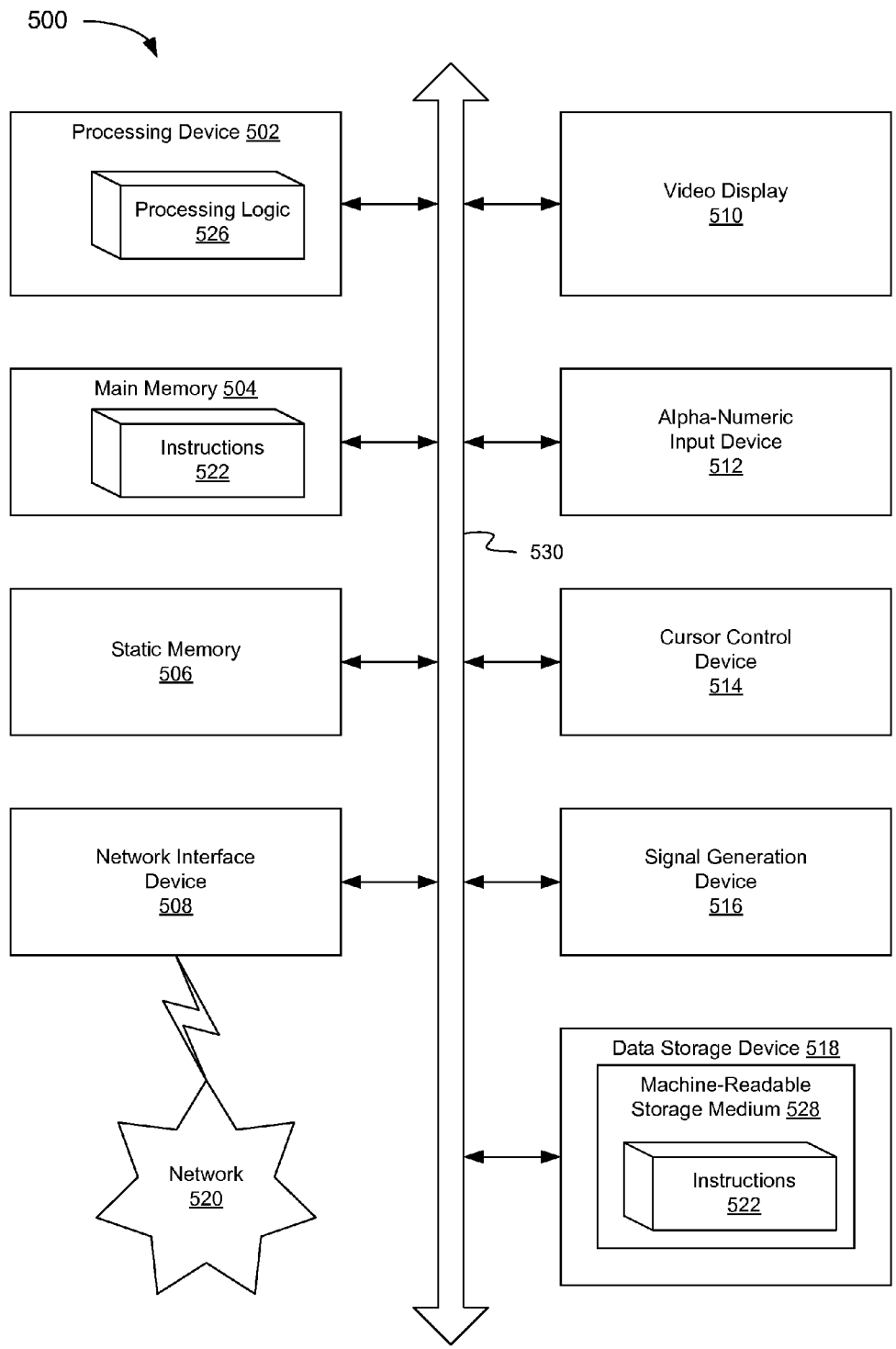
FIG. 5 is a block diagram illustrating one embodiment of a computer system, according to an embodiment.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-accessible storage media. The instructions 522 may further be transmitted or received over a network 520 via the network interface device 508.

The machine-readable storage medium 528 may also be used to store instructions to perform an error simulation method as described above, and/or a software library containing methods that call the above applications. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
    intercepting a first occurrence of an external function call made by a computer application program, the functional call intended for a shared library;
    identifying a test scenario corresponding to the function call, the test scenario comprising a plurality of simulated output parameters;
    providing, by a processing device, a first simulated output parameter of the plurality of simulated output parameters to the computer application program in response to the first occurrence of the function call for the computer application program to enter an error execution path, wherein the shared library does not provide an output parameter to the computer application program;
    receiving an indication of a behavior of the computer application program in response to the first simulated output parameter;
    intercepting a second occurrence of the external function call made by the computer application program; and
    providing a second simulated output parameter of the plurality of simulated output parameters to the computer application program in response to the second occurrence of the function call.

2. The method of claim 1, wherein each of the plurality of simulated output parameters will cause the computer application program to enter a different execution path.

3. The method of claim 1, further comprising:
    determining if there is an additional simulated output parameter in the test scenario; and
    in response to determining an additional simulated output parameter in the test scenario, providing the additional simulated output parameter to the computer application program.

4. The method of claim 1, further comprising:
    storing the indication of the behavior of the computer application program in a storage device for later analysis.

5. The method of claim 1, wherein the indication of the behavior of the computer application program comprises an indication of an execution path entered by the computer application in response to the first simulated output parameter.

6. A system comprising:
    a processing device; and
    a memory coupled to the processing device, the memory to store an error simulation module, executed from the processor and the memory, wherein the error simulation module comprises:
        a test scenario identifier module to intercept a first occurrence of an external function call made by a computer application program, the functional call intended for a shared library, identify a test scenario corresponding to the function call, the test scenario comprising a plurality of simulated output parameters, and provide a first simulated output parameter of the plurality of simulated output parameters to the computer application program in response to the first occurrence of the function call for the computer application program to enter an error execution path, wherein the shared library does not provide an output parameter to the computer application program, the test scenario identifier module further to intercept a second occurrence of the external function call made by the computer application program and provide a second simulated output parameter of the plurality of simulated output parameters to the computer application program in response to the second occurrence of the function call; and
        a simulation analysis module to receive an indication of a behavior of the computer application program in response to the first simulated output parameter.

7. The system of claim 6, wherein each of the plurality of simulated output parameters will cause the computer application program to enter a different execution path.

8. The system of claim 6, wherein the test scenario identifier module is further to:
- determine if there is an additional simulated output parameter in the test scenario; and
- in response to determining an additional simulated output parameter in the test scenario, provide the additional simulated output parameter to the computer application program.

9. The system of claim 6, wherein the simulation analysis module is further to:
- store the indication of the behavior of the computer application program in a storage device for later analysis.

10. The system of claim 6, wherein the indication of the behavior of the computer application program comprises an indication of an execution path entered by the computer application in response to the first simulated output parameter.

11. A non-transitory machine-readable storage medium storing instructions which, when executed, cause a processing device to:
- intercept a first occurrence of an external function call made by a computer application program, the functional call intended for a shared library;
- identify a test scenario corresponding to the function call, the test scenario comprising a plurality of simulated output parameters;
- provide, by the processing device, a first simulated output parameter of the plurality of simulated output parameters to the computer application program in response to the first occurrence of the function call for the computer application program to enter an error execution path, wherein the shared library does not provide an output parameter to the computer application program;
- receive an indication of a behavior of the computer application program in response to the first simulated output parameter;
- intercept a second occurrence of the external function call made by the computer application program; and
- provide a second simulated output parameter of the plurality of simulated output parameters to the computer application program in response to the second occurrence of the function call.

12. The non-transitory machine-readable storage medium of claim 11, wherein each of the plurality of simulated output parameters will cause the computer application program to enter a different execution path.

13. The non-transitory machine-readable storage medium of claim 11, wherein the instructions further cause the processing device to:
- determine if there is an additional simulated output parameter in the test scenario; and
- in response to determining an additional simulated output parameter in the test scenario, provide the additional simulated output parameter to the computer application program.

14. The non-transitory machine-readable storage medium of claim 11, wherein the instructions further cause the processing device to:
- store the indication of the behavior of the computer application program in a storage device for later analysis.

* * * * *